(12) United States Patent
Schneider et al.

(10) Patent No.: US 6,179,022 B1
(45) Date of Patent: Jan. 30, 2001

(54) MOLDED ONE-PIECE WEIGHING FUNNEL

(76) Inventors: Jinghua Schneider; Wei Min Gan; Xiao Gang Dou, all of 980 Cheswick Dr., Gurnee, IL (US) 60031

( * ) Notice: Under 35 U.S.C. 154(b), the term of this patent shall be extended for 0 days.

(21) Appl. No.: 09/274,044

(22) Filed: Mar. 22, 1999

(51) Int. Cl.⁷ ................................................. B65B 39/00
(52) U.S. Cl. ........................ 141/331; 141/338; 141/343
(58) Field of Search .................................. 141/331, 337, 141/338, 339, 343

(56) References Cited

U.S. PATENT DOCUMENTS

| | | | |
|---|---|---|---|
| 426,165 | * | 4/1890 | Brittin . |
| 1,644,837 | * | 10/1927 | Johnson . |
| 5,092,471 | * | 3/1992 | Pinizzotto et al. ................... 141/331 |
| 5,168,908 | * | 12/1992 | Boyum ................................. 141/331 |
| 5,488,979 | * | 2/1996 | McKenzie ............................ 141/331 |

* cited by examiner

Primary Examiner—David J. Walczak
Assistant Examiner—Khoa D. Huynh
(74) Attorney, Agent, or Firm—Paul H. Gallagher

(57) ABSTRACT

Mold apparatus for molding a weighing funnel that has a large diameter central segment, and a hole at each end that is smaller than the central segment. A 2-part core is used, the two parts together forming the size and shape of the article to be molded, and to remove the core from the molded article, the parts are withdrawn individually through a hole at the end of the article.

5 Claims, 3 Drawing Sheets

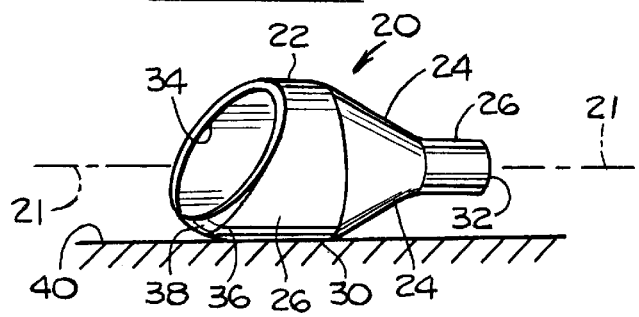
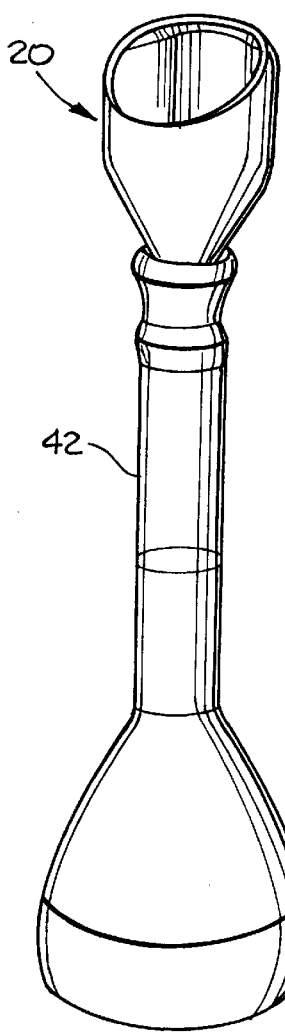
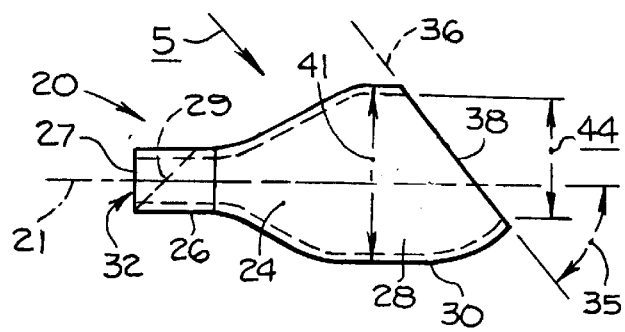
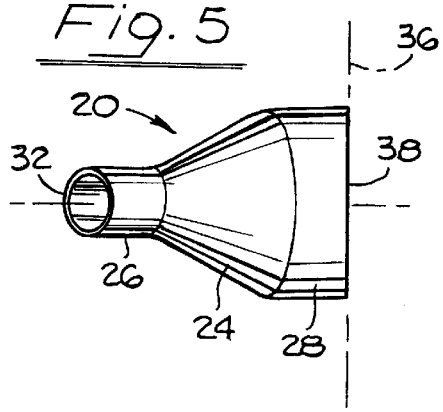
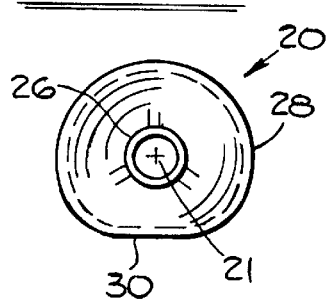

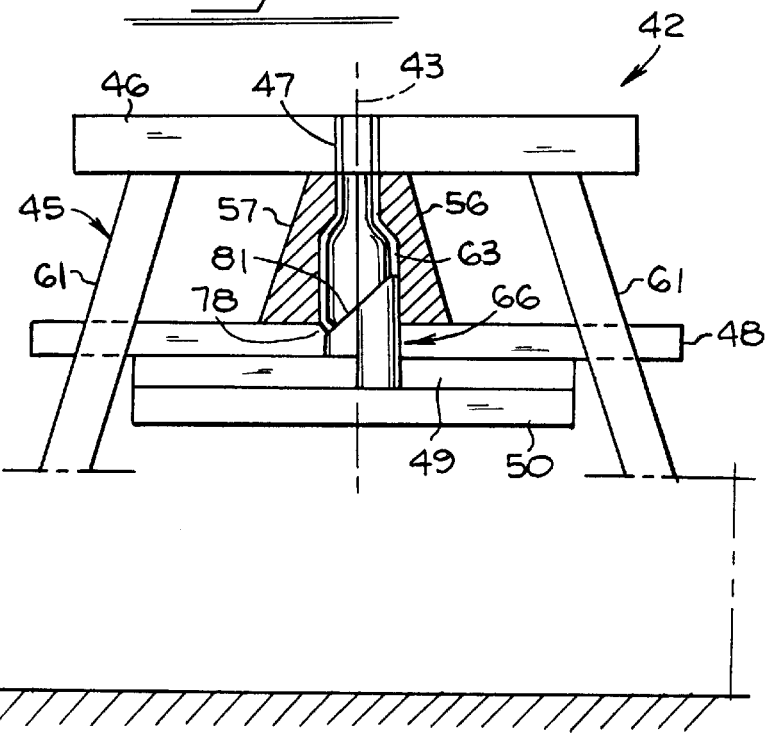
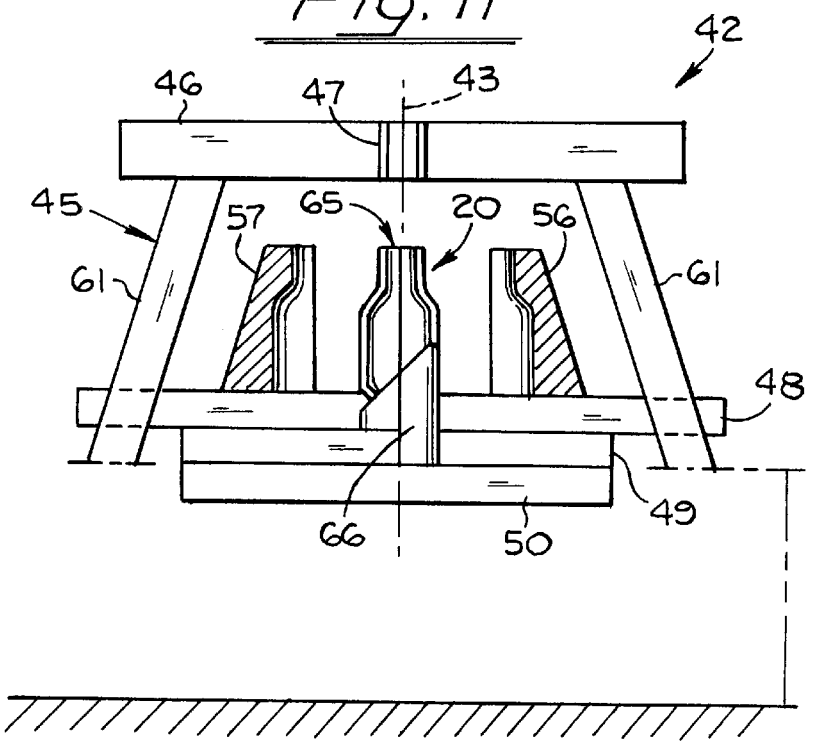

MOLDED ONE-PIECE WEIGHING FUNNEL

FIELD OF THE INVENTION

The invention resides in the general field of injection molds, for molding plastics.

SUMMARY OF THE PRESENT INVENTION

The mold of the invention includes a core construction for molding a shape that could not be molded by previously known molds.

The article to be molded is hollow, with opposite end openings smaller than the interior. In previous molds and core constructions, it was not possible to mold such an article in a single piece. It is desired to mold it as a single piece, and in a one-stop operation, to reduce costs of manufacture.

A broad object of the present invention is to provide injection mold/core construction having the following features and advantages. The molded article is hollow, or tubular, with small openings at its ends. The core is made up of a pair of parts fitted together, but moveable relative to each other in endwise direction. One of the core parts can be individually removed first, and then the other core part removed.

The core parts are held in position in the cavity block in the mold, in which they are positioned.

As a consequence of the immediately forgoing feature, the molded article can be molded, and removed from the mold, in a minimum of time, thereby reducing costs of manufacture, and the molded article is in its final intended shape, eliminating the necessity for cutting away parts of the molded article, or for trimming it or otherwise treating it after it is removed from the mold.

The core parts are so positioned in the molding cavity that they form one end of the cavity, and thereby form one of the end openings of the molded article and the surrounding defining edges thereof.

The device is of such character, in position and function, that as used in an injection mold, injection parts can be positioned at any location in the mold cavity.

BRIEF DESCRIPTION OF THE INDIVIDUAL FIGURES OF THE DRAWINGS

FIG. 1 is a perspective view of the molded article, resting on the surface of a weighing scale.

FIG. 2 is a perspective view of the molded article in upright position and functioning as a tunnel, in association with a receiving flask.

FIG. 3 is an end view taken from the right of FIG. 1.

FIG. 4 is a side view taken from the right of FIG. 3.

FIG. 5 is a perspective view taken in the direction of the arrow 5 of FIG. 4.

FIG. 10 is a view oriented according to FIG. 8 with the mold parts closed.

FIG. 11 is a view oriented according to FIGS. 8 and 10, with the right halt or the core drawn down, and at least partially removed from the molded article, and with the molded article still in place in the mold.

DETAILED DESCRIPTION OF THE DRAWINGS

Figure 6:
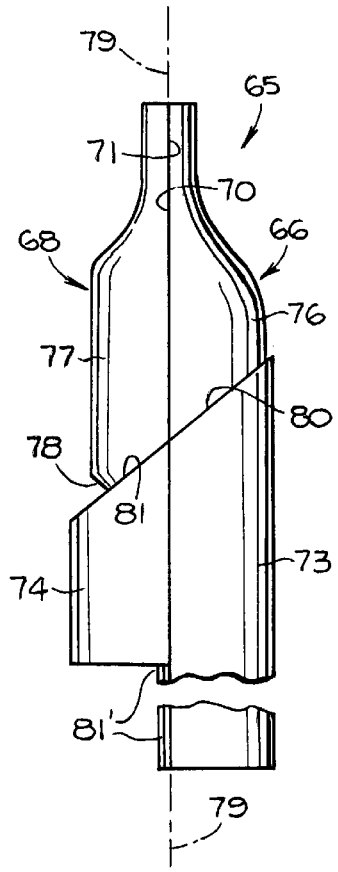
FIG. 6 is a side view of the complete two-part core.

For convenience in consideration of the disclosure, a description of the article to be molded is given first, followed by a description of the mold core itself, and the mold in which it is positioned.

The molded article is indicated at 20, the article being tubular, hollow, and having open ends. It is oriented according to a central longitudinal axis 21. The article includes a main body segment 22 of large dimensions, merging into a conical segment 24, the latter then merging into a reduced pouring neck 26 of small dimension. The body segment 22 has a major portion 28, nearly cylindrical in shape, but having a flat bottom surface 30 (see also FIG. 3) also referred to as a resting surface.

The article is shown in FIGS. 1, 3, 4 as resting on its side, on its flat surface 30, but it assumes also an upright position, in a pouring or emptying position, as in FIG. 2.

The pouring neck 26 has an open end 32, and the body has an opening 34 at its other end. The pouring neck 26 may have an end surface 27 perpendicular to the axis 21 as shown in solid lines (FIG. 4), or disposed at an oblique angle thereto as shown in dot-dash line 29. The opening 34 lies in a plane indicated by the line 36 (FIGS. 4, 5) which is inclined relative to the central longitudinal axis 21 at an angle 35 which is preferably about 50° but this dimension is not critical. The plane 36 cuts through the cylindrical portion of the segment 22 at the top of the latter, but at the bottom it cuts through at a position that may be referred to as an end surface of the article, producing a turned up edge 38 forming a low confining wall for holding the contents in the article when in the position of FIG. 1.

Heretofore, such an article was formed by first molding it with a continuous or closed end surface, as at the right hand end in FIG. 4, and then cutting through the article at the position of the plane 36 (FIG. 4) which involved an operation separate from and in addition to the actual molding step.

In the use of the article, it is placed on a supporting surface 40 (FIG. 1) which in the present instance represents a weighing scale, with the bottom surface 30 on the surface 40, and then the materials or ingredients for a prescription are inserted through the open end 34 into the article. Such materials may be liquid or solid, and in either case, the confining wall 38 prevents those ingredients from falling or running out of the article through the opening 34, in handling it. The scale 40 determines the correct amount to be inserted in the article, and then in the continued use thereof, the article is fitted and inserted into the flask or any narrow neck item 39 (FIG. 2) and the contents thereby emptied into the flask. In this step, a liquid may be sprayed into the article, through the large open end 34, for washing the materials therefrom into the flask.

The molded article 20 is known as a weighing tunnel and is preferably transparent and made of plastic. Among the plastics available, the following have been proven practical, polypropylene, polyethylene, and polystyrene.

Polyethylene is advantageous because it is highly antistatic.

It is also found practical to make the article of reusable borosilicate glass. Plastic is preferred, being custom in such use thereof and as recommended by safety organizations. Glass is considered less sate because of its fragility.

The one-piece nature of the article produces an extremely great advantage in cost of manufacture, but a difficulty arises related directly to this feature: the end openings must be of lesser dimension than the main internal dimension in order to make it usable as a weighing tunnel, while preventing the accidental loss of the ingredients. The core of the present invention makes it possible to make the article of one-piece character. The core is made up of multiple pieces (2) that are sufficiently small to be removed through the open end 34 of the article in the direction of the longitudinal axis 21, that is, to withdraw each individually in longitudinal direction. The central large segment 22 of the article, is of the greatest transverse dimension, as indicated by the arrow 41 of FIG. 4. In comparison with that dimension, attention is directed to the arrow 44 indicating the effective dimension of the opening 34, i.e. perpendicular to the axis. It is pointed out that the opening 32 is of course also smaller than the dimension 41. As used herein references may be made to radial dimensions, as in a fully cylindrical shape, notwithstanding the flat bottom surface 30.

Summarizing, each part of the core is sufficiently small to be withdrawn from the molded article through the large opening 34. Attention is directed particularly to FIGS. 1 and 4 showing the confining wall 38 extending above the bottom surface 30 to confine the materials in the article. The pouring neck is of course above the flat bottom, in that position of the article.

Figure 8:
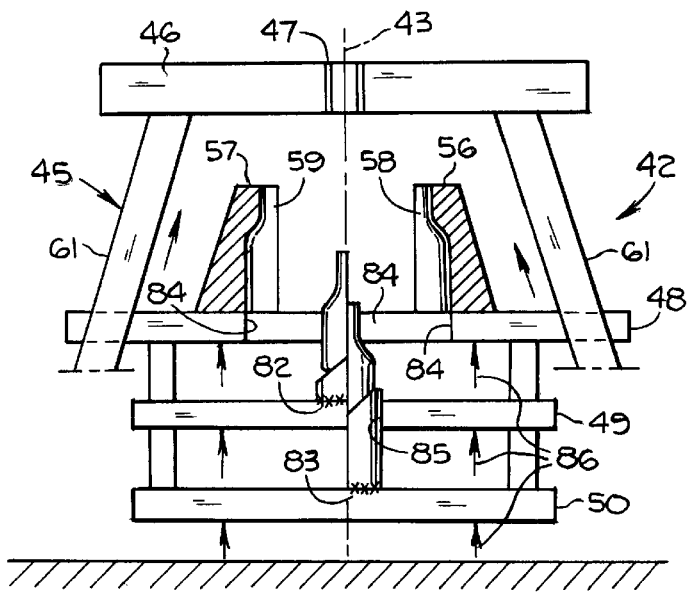
FIG. 8 is a semi-diagrammatic view of the mold in open position together and the core of the invention fitted in position in the mold.
Figure 9:
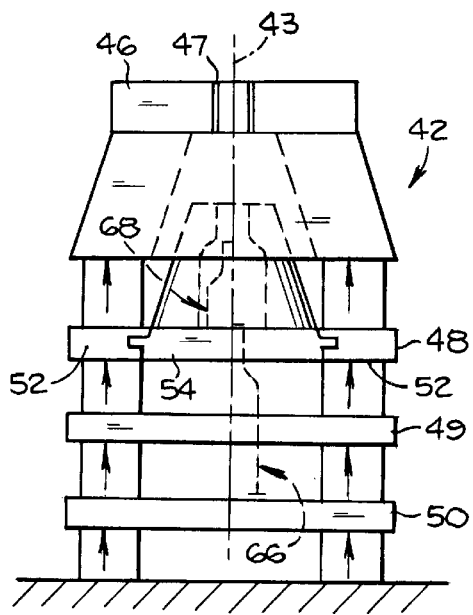
FIG. 9 is an end view from the right of FIG. 8.

Reference is now made to the mold for forming the article, as shown in FIGS. 8–10. FIG. 8 shows a mold 42 in diagrammatic form, having a central vertical axis 43. It includes a stationary frame 45 which itself includes a top fixed plate 46 having injection ports 47 therethrough. Blocks 48, 49, 50 are mounted for vertical sliding movements on the frame. In FIG. 9, the block 48 is shown to nave a main part 52, and insert parts 54 the latter being slidable toward and from each other (FIG. 8), carrying cavity blocks 56, 57 with internal cavities 58, 59. To produce this sliding movement, the mold frame is provided with diagonal guide rods 61, and the insert parts 54 of the block 48 have holes receiving those diagonal guide rods. Consequently, in response to upward sliding movement of the block 48, due to the inclination of the rods and holes, the guide rods guide the cavity blocks 56–57 inwardly into engagement with each other to closed position shown in FIG. 10, and into engagement with the top plate 46.

The cavities 58, 59 then form a single cavity 63 except for the bottom. In such upper, or closed, position of the cavity blocks 56, 57, the injection ports 47 lead into the cavity 63 as referred to again more specifically hereinbelow.

The core is indicated in its entirety at 65 (FIG. 6), being made up of two opposed parts 66, 68 with flat sides 70, 71 (see also FIG. 7) fitted together. The mold parts are provided with bottom base elements 73, 74, and upper elements 76, 77. The entire mold, when the parts are assembled, are positioned on opposite sides of a plane 79 which, upon completion of the molding step, contains the longitudinal axis 21 (FIG. 4). The core parts 66, 68 together are shaped to form the final molded article, the part 66 being the longer, forming that portion of the article that is uppermost, (FIG. 1), while the part 68 is shorter and has an inturned bottom element 78. The core parts are positioned in the cavity 63 as described below.

Figure 7:
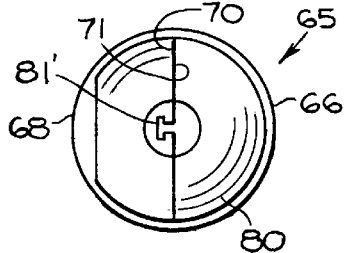
FIG. 7 is an end view taken from the top or FIG. 6.

When the core parts are fitted together in operable position as shown in FIGS. 6 and 7, the parts 76, 77 form a junction with the respective bottom elements 73, 74 along a line 80. The bottom parts 73, 74 extend laterally or radially outwardly beyond the parts 76, 77, to form a continuous surface along the line 80 which itself forms the bottom surface 81 of the cavity (FIG. 10).

The core parts are provided with cooperating tongue and groove elements 81' securely holding them together while enabling them to be moved longitudinally relative to each other.

The core parts 66, 68 are secured to the sliding blocks 49, 50, respectively, as indicated at 82, 83 (FIG. 8). The core parts together extend through a hole 84 in the block 48 with the core part 66 also extended through a hole 85 in the block 49. In this position, the upper parts 76, 77 extend up into the space between the cavity blocks 56, 57, as the slidable mold blocks 48, 49, 50 are raised by a suitable means of known kind indicated by the arrows 86. This raising motion moves the cavity blocks 56, 57 inwardly toward each other, as explained above, and upwardly until they engage the top member 46.

It will be appreciated that the upper elements 76, 77 together, are of less transverse dimension than final cavity, resulting from the cavities 58, 59 fitting together, to form the article cavity 63 with which the injection ports 47 register. The molding material, plastic, is then injected into the cavity through those ports and upon hardening, forms the final molded article.

In such position of the core, as indicated above, the top surface 81 of the bottom elements of the core defines the edge of the large opening 34 (FIG. 1) and it will be noted that the portion or element 78, (FIG. 7) as now shown in FIG. 10, forms the inturned element 38 (FIG. 3) of the molded article.

After the molding step just described, and the molded article has set, the blocks 48, 49, 50 (FIG. 11) are lowered to the positions shown in FIG. 11. This movement of the block 48, separates the cavity blocks 56, 57. Thereafter the block 50 is lowered, drawing the core part 66 downwardly out of the molded article.

Thereafter the molded article is flexed to align the other core part, 68, with the hole 34, which releases the molded article and enables it to be removed from the mold.

What is claimed is:

1. A weighing funnel comprising
   a single, integral, one-piece, molded, tubular member having a central longitudinal axis,
   the tubular member having a main segment and first and second end openings each smaller than the main segment,
   the tubular member having a resting element on its outer surface of such shape relative to the remainder of the outer surface as to be capable of maintaining the tubular member in a stable position on a supporting surface with said axis parallel to the supporting surface, and
   the tubular member having segments forming lower edges of the openings at levels above the supporting surface when the tubular member is resting on the supporting surface, whereby to confine in the tubular member a quantity of loose material introduced therein,
   the main segment is nearly cylindrical in shape, but has a flat side forming said resting element,
   the main segment is the largest part of the tubular member in diametric direction,
   the second end opening lies in a plane cutting through the cylindrical part of the tubular member and extending obliquely endwise away from the first opening beyond the main segment, thereby forming an end surface extending diametrically inwardly from the flat side and forming said lower edge of the second opening.

2. A weighing funnel according to claim 1 wherein,
   the end openings are positioned with said axis extending through both of the end openings.

3. A weighing funnel according to claim 1 wherein,
   the tubular member has a pouring neck extending axially beyond the main segment, and the pouring neck includes, at its outer end, a first of the end openings.

4. A weighing funnel according to claim 3 wherein, the tubular member at its end opposite the pouring neck includes a second of the end openings, and the second opening is disposed in a plane at an oblique angle to said axis, wherein the second opening is substantially greater in size than the first opening.

5. A weighing funnel according to claim 1 wherein, the pouring neck is the smallest part of the tubular member in diametrical direction.

* * * * *